United States Patent [19]

Sachs

[11] 3,725,880
[45] Apr. 3, 1973

[54] ARRANGEMENT FOR THE DETECTION OF FAULTS IN ELECTRONIC CIRCUITS

[75] Inventor: Harald Sachs, Faistenhaar, Germany

[73] Assignee: Siemens Aktiengesellschaft, Berlin and Munich, Germany

[22] Filed: Mar. 4, 1971

[21] Appl. No.: 120,987

[30] Foreign Application Priority Data

Mar. 13, 1970 Germany..................P 20 12 068.7

[52] U.S. Cl......340/173 RC, 179/100.2 B, 324/112, 333/29, 340/174.1 B
[51] Int. Cl. ............................................G11c 21/00
[58] Field of Search ..............179/100.2 B, 100.2 RE; 324/112; 340/174.1 B, 174.1 P, 173 RC; 333/29, 30

[56] References Cited

UNITED STATES PATENTS

| | | | |
|---|---|---|---|
| 2,378,389 | 6/1945 | Begun | 340/174.1 B |
| 2,513,683 | 7/1950 | Shaper et al. | 340/174.1 P |
| 2,521,623 | 9/1950 | Arndt, Jr. et al. | 179/100.2 B |
| 2,832,064 | 4/1958 | Lubkin | 340/174.1 P |
| 3,064,241 | 11/1962 | Schneider | 340/174.1 P |

*Primary Examiner*—J. Russell Goudeau
*Attorney*—Hill, Sherman, Meroni, Gross & Simpson

[57] ABSTRACT

An arrangement for searching for errors in electronic circuits employs a circulating memory for storing the output signals of the circuit to be checked, a gate circuit which generates a write-stop signal upon the occurrence of an error to prevent storage of the output signals into the circulating memory, and by means for indicating the content of the circulating memory.

3 Claims, 3 Drawing Figures

INVENTOR
Harald Sachs
BY
ATTYS

ARRANGEMENT FOR THE DETECTION OF FAULTS IN ELECTRONIC CIRCUITS

BACKGROUND OF THE INVENTION

1. Field of the Invention

This invention relates to an arrangement for locating errors in electronic circuits.

2. Description of the Prior Art

A display of periodic processes on an oscillograph picture screen is made in searches for errors in electronic apparatus and control systems. This method fails to indicate all errors, for example, the method would fail to indicate sporadic errors. The single occurrence of an error remains virtually invisible on the oscillograph screen among, for example 10,000 or more correct data indications. However, even if the error occurs on the average in every other cycle, the various signals can no longer be correlated on a multi-beam oscillograph. Even storage oscillographs and photographic additions or accessories on non-storing oscillographs offer no improvement for the case or rarely occurring errors. The time expended in search for such errors is therefore excessive. The time required to search for such errors is, however, also of considerable economic importance when, for example, central units of data processing installations are to be checked.

SUMMARY OF THE INVENTION

It is therefore the primary object of this invention to provide an arrangement with which the error search times can be greatly reduced, even in the case of sporadic errors, in electronic apparatuses and control systems, particularly in digital controls.

According to the invention, this objective is realized by the provision of a circulating memory for storing the output signals of the circuit to be checked. A gate circuit is employed to generate a write-stop signal upon the occurrence of an error to inhibit storage of the output signals in the circulating memory and an indicating device is provided to represent the content of the circulating memory.

In the arrangement according to the present invention, the output signals of a circuit to be checked are not directly depicted but are written into a circulating memory. Because of the limited capacity of the circulating memory, the contents thereof are constantly being overwritten. If an error appears, then the storage of the output signals is interrupted. The circulating memory then provides the entire history of the error and the stored contents can be reproduced with the aid of an indicating device.

The signal which interrupted the writing process of the circulating memory, the so-called write-stop signal, must be formed individually with respect to an error. The formation of this signal takes place through the utilization of a gate circuit whose output, for example, is a binary "1" (write-stop) when its input signals (the output signals of the circuit to be checked) have values which they assume in the case of an error and only the case of an error.

The circulating memory can be realized through the utilization of rotating drum memories and transit-time stores, for example, acoustical transit-time stores, MOS-FET shift registers and registers constructed of bipolar transistors.

To be compatible with the four-beam oscillographs as are presently employed, it could be sufficient to record four independent signals simultaneously. The signals could be, for example, the input signals of the circuit to be checked and the output signals of three different points of the circuit to be checked. Therefore, in the case of a rotating drum storage unit four writing and reproducing heads would have to be provided. It is, however, also possible to provide more than four simultaneously drivable storage units. In this case, it is not then possible to reproduce all of the signals simultaneously on a oscillographic display.

The indicating device can therefore consist of an oscillograph, and if the circulating memory consists of shift registers, then the register content can be indicated with corresponding indicating lamps.

BRIEF DESCRIPTION OF THE DRAWINGS

Other objects, features and advantages of the invention will be best understood from the following detailed description of an exemplary embodiment thereof taken in conjunction with the accompanying drawing, in which.

DESCRIPTION OF THE PREFERRED EMBODIMENTS

Figure 1:
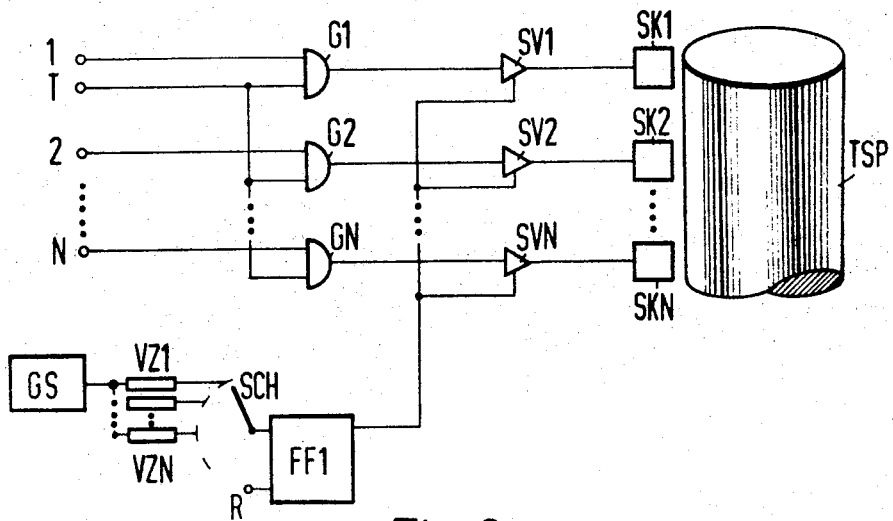
FIG. 1 is a schematic circuit diagram of an arrangement which utilizes a rotating drum as the circulating memory.

Referring to FIG. 1, a drum memory is designated with the reference character TSP. The output signals of the circuit to be tested and, possibly, the input signals are stored in different tracks of the drum memory TSP. For this purpose there are provided a plurality of AND-circuits G1 to GN, a plurality of writing amplifiers SV1 to SVN and a plurality of writing heads SK1 to SKN. The signals to be recorded, therefore the output signals of the circuit to be checked and its input signals, are fed to the AND-circuits G1 to GN. For example, the first signal to be recorded at an input 1 is applied to the first AND-circuit G1, the second signal to be recorded and received at an input 2 is applied to the AND-circuit G2, and the N-TH signal to be recorded is received at an input N and fed to the AND-gate GN. Scanning pulses T are provided at the scanning frequency to each of the AND-gates, the scanning frequency being at least twice as great as the frequency of the signals to be recorded. The outputs of the AND-circuits G1 to GN are connected to the writing amplifiers SV1 to SVN, respectively. These writing amplifiers SV1 to SVN have, in addition to input feed line connected in common with one another for receiving an inhibiting signal whenever there is an occurrence of an error, that is, in response to a write-stop signal as will be discussed below. The writing amplifiers SV1 to SVN drive the writing heads SK1 to SKN for entering data into the drum memory TSP.

The write-stop signal is formed through the utilization of a gate circuit GS. Since the error possibilities depend on the circuit to be checked, the design of the gate circuit GS must also be accordingly different in each case, for the error to be ascertained. The gate circuit GS must be constructed in such a way that at its output binary "1" is delivered as a write-stop signal when the input signals supplied to the gate GS have values which indicate errors. The write-stop signal is supplied by way of delay members VZ1 to VZN and a switch SCH to a binary flip-flop circuit FF1. The binary flip-flop circuit FF1 is set by the write-stop signal so that at its output there appears a signal that is supplied to the writing amplifiers SV1 to SVN to inhibit the writing amplifiers. The signals presented to the inputs 1 to N and to the AND-circuits G1 to GN are then not effected to drive the writing heads SK1 to SKN and, therefore, cannot be stored into the corresponding tracks of the drum memory TSP. If the signals to be recorded of the circuit to be checked are again to be written into the drum memory, then a resetting signal is fed to an input R of the bistable flip-flop circuit FF1. The bistable flip-flop circuit FF1 is reset and the writing amplifiers SV1 to SVN are turned on. Through the utilization of the delay members VZ1 to VZN, which have different delay times, it is provided that the recording of signals is not immediately negated on the occurrence of a write-stop signal. It is then possible to store the error commencement in the circulating memory TSP.

The reading out of the drum memory TSP is accomplished with the usual electronic reading portions of a system. The reading signals of each track are supplied to the indicating device and represented by the indicating device. Since, on the occurrence of an error, the writing process of the drum memory TSP is interrupted, and thereby the stored signals in the individual tracks remain the same, only the signal error situation can be depicted.

Figure 2:
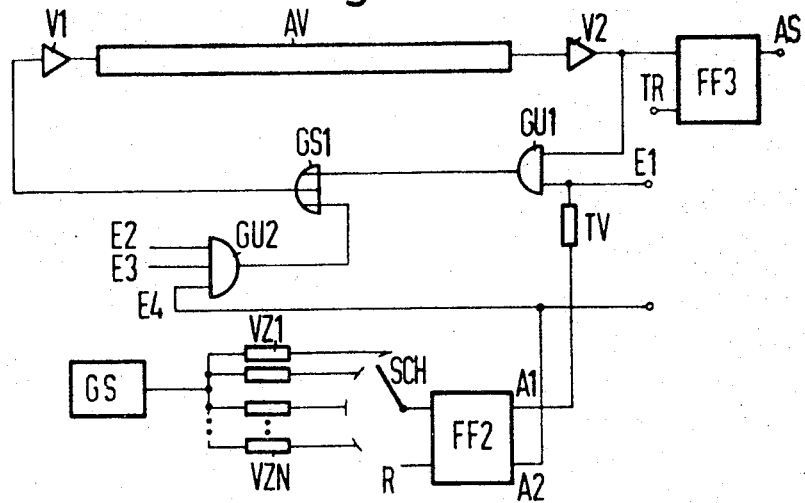
FIG. 2 illustrates, in schematic form, an arrangement which utilizes a transit-time member as a circulating memory.

Referring now to FIG. 2, the circulating memory comprises storage units that utilize transit-time members. The number of storage units corresponds to the number of signals to be recorded. Each storage unit contains a transit-time member, for example, an acoustical delay line AV.

Figure 3:
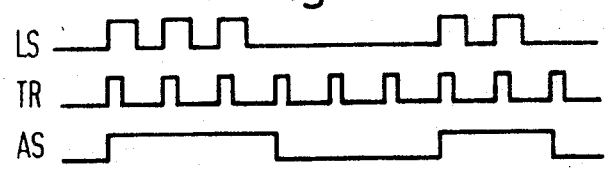
FIG. 3 gives a graphic example of a pulse diagram which is appropriate to the circuits described for the present invention.

The signal to be recorded is first applied to an AND-circuit GU2 at its input E2. Assuming that no write-stop signal is present (the input E4 is occupied) and that on an input E3 there is applied a scanning pulse, the AND-circuit GU2 is open and the signals to be recorded are fed by way of an OR-circuit GS1 to an amplifier V1 of the delay line AV. After traversing the delay line AV and another amplifier V2, the signals pass to an AND-circuit GU1. If no write-stop signal is present, then this AND-circuit GU1 is blocked by a blocking signal at its input E1 so that the signals can no longer circulate. The control of the AND-circuits GU1 and GU2 takes place by way of a bistable flip-flop circuit FF2. The write-stop signal is generated in the gate circuit GS and is fed by way of the delay members VZ1 to VZN and the switch SCH to the bistable flip-flop circuit FF2. As long as no write-stop signal is present, the output A1 of the bistable flip-flop circuit FF2 is not set. This condition signifies that the AND-circuit GU2 is open and that the AND-circuit GU1 is closed. The signals which are fed to the delay line AV cannot circulate. If a write-stop signal is formed by the gate circuit GS, then the bistable flip-flop circuit FF2 flips and therefore the output A1 is set and the output A2 is not set. Consequently, the AND-circuit GU2 is blocked, and the AND-circuit GU1, after a delay effected by an intermediate delay member TV, is open. The signals offered to the input E2 of the gate circuit GU2 can no longer pass into the storage unit; the signals already fed to the acoustic delay line AV can no longer circulate. Another bistable flip-flop circuit FF3 is connected to the output of the amplifier V2 and has an output AS connected to an indicating device, for example, to an oscillograph. The bistable flip-flop circuit FF3 also includes an input R to which there is supplied a resetting pulse TR. The resetting pulse TR is represented, together with the signals LS supplied to the bistable flip-flop circuit FF3 of the circulating memory and the output signal AS of the flip-flop circuit FF3, in FIG. 3. The frequency of the resetting pulse TR is equal to that of the scanning pulse signal which is applied to the input E3 of the AND-cirucit GU2.

In FIG. 2 there is represented only a single storage unit of the circulating memory. This storage unit consists of the acoustic delay line AV, the amplifiers V1, V2, the AND-circuits GU1, GU2 and the OR-circuit GS1. The gate circuit GS, the delay members VZ1 to VZN and the bistable flip-flop circuit FF2 are common to all of the storage units. The outputs A1 and A2 of the bistable flip-flop circuit FF2 are connected with the AND-circuits corresponding to the AND-circuits GU1 and GU2 of the remaining storage units which are not shown in the drawing. The acoustic delay line AV can be replaced by other transit-time members or by shift registers. If shift registers are utilized, then the indicating device may be realized through the utilization of small lamps, as well known in the art, to indicate the content of the shift register.

While I have described my invention by reference to specific illustrative embodiments thereof, many changes and modifications may be made of my invention by those skilled in the art without departing from the spirit and scope thereof and it is to be understood that I intend to include within the patent warranted hereon all such changes and modifications as may reasonably and properly be included within the scope of my contribution to the art.

What I claim is:

1. An arrangement for searching for errors in electronic circuits comprising: a circulating memory connected to a circuit to be checked for storing output signals of the circuit, a gate circuit connected to the circuit to be checked for detecting an error in its output signals and responsive to generate a write-stop signal, means interposed between the circulating memory and the circuit to be checked and connected to said gate circuit for inhibiting storage in the circulating memory in response to a write-stop signal, and means connected to said circulating memory for indicating the data content thereof, said circulating memory comprising a plurality of storage units corresponding to the number of signals to be recorded, said storage units including a transit-time member, an OR-circuit including a plurality of inputs and an output, a first amplifier connected to the output of said OR-circuit and to a transit-time member of a storage unit, a first AND-circuit having an output connected to one of said inputs of said OR-circuit and having a plurality of inputs, a second amplifier having an input connected to said transit-time member and an output connected to one of the inputs of said first AND-circuit, a second AND-circuit having a first input for receiving a signal to be recorded, a second input for receiving a timing pulse signal, and an output connected to another input of said OR-circuit, a bistable circuit having a first output connected to a second input of said first AND-circuit and a second output connected with a third input of said second AND-circuit, said bistable circuit having a setting input for receiving the write-stop signals.

2. The arrangement according to claim 1, wherein said transit-time member comprises a shift register.

3. The arrangement according to claim 1 comprising a plurality of delay members each having a different delay time connected between said setting input of said bistable circuit and said gate circuit, and means interposed between said delay members and said setting input for selecting a delay member and its corresponding delay time for a write-stop signal.

* * * * *